US008718558B2

(12) United States Patent
Montemurro

(10) Patent No.: US 8,718,558 B2
(45) Date of Patent: May 6, 2014

(54) METHODS AND APPARATUS FOR USE IN FACILITATING COMMUNICATIONS OVER FIRST AND SECOND WIRELESS CONNECTIONS OF A WIRELESS TRANSCEIVER

(75) Inventor: Michael Peter Montemurro, Mississagua (CA)

(73) Assignee: Blackberry Limited, Waterloo (CA)

( * ) Notice: Subject to any disclaimer, the term of this patent is extended or adjusted under 35 U.S.C. 154(b) by 157 days.

(21) Appl. No.: 13/449,879

(22) Filed: Apr. 18, 2012

(65) Prior Publication Data

US 2013/0281020 A1 Oct. 24, 2013

(51) Int. Cl.
*H04B 7/00* (2006.01)
(52) U.S. Cl.
USPC ..... 455/41.2; 455/168.1; 455/103; 455/176.1
(58) Field of Classification Search
USPC .............. 455/41.2, 168.1, 103, 176.1, 180.1, 455/188.1, 104, 13.3
See application file for complete search history.

(56) References Cited

U.S. PATENT DOCUMENTS

| | | | | |
|---|---|---|---|---|
| 6,892,083 | B2 * | 5/2005 | Shostak | 455/575.6 |
| 6,965,675 | B1 | 11/2005 | Trimberger et al. | |
| 7,200,112 | B2 | 4/2007 | Sundar et al. | |
| 7,233,792 | B2 * | 6/2007 | Chang | 455/422.1 |
| 7,436,789 | B2 * | 10/2008 | Caliskan et al. | 370/310.1 |
| 7,613,428 | B2 * | 11/2009 | Blight et al. | 455/41.2 |
| 7,773,972 | B2 * | 8/2010 | Croome et al. | 455/411 |
| 8,045,980 | B2 | 10/2011 | Buckley et al. | |
| 8,254,985 | B2 | 8/2012 | Ekici et al. | |
| 8,467,725 | B2 * | 6/2013 | Alrabady et al. | 455/41.2 |
| 2003/0051052 | A1 * | 3/2003 | Shteyn et al. | 709/245 |
| 2003/0142641 | A1 | 7/2003 | Sumner et al. | |

(Continued)

FOREIGN PATENT DOCUMENTS

| | | |
|---|---|---|
| EP | 2161962 A1 | 3/2010 |
| JP | 20129964 A | 1/2012 |
| WO | 2007110473 A1 | 10/2007 |
| WO | 2012006446 A1 | 1/2012 |

OTHER PUBLICATIONS

Bluetooth SIG Imaging Working Group:, "Basic Imaging Profile. Interoperability Specification", Bluetooth Documentation, Jul. 25, 2003, XP007900617, pp. 1-100, http://www.bluetooth.com/NR/rdonlyres/182ccd92-3481-44F0-B901-9181BE573AFA/924/BIP_SPEC_V10.pdf.

(Continued)

*Primary Examiner* — Minh D Dao
(74) *Attorney, Agent, or Firm* — Ridout & Maybee LLP

(57) ABSTRACT

A wireless communication device includes a first wireless transceiver and a second wireless transceiver. The wireless device is configured for communicating via the first transceiver over a first connection with a first device, where communications to and from the wireless device are addressed with a first hardware address assigned to the first transceiver. The wireless device is further configured for communicating via the first transceiver over a second connection with a second device, where communications to and from the wireless device are addresses with a second hardware address assigned to the second transceiver. The first transceiver may be configured for communications in accordance with IEEE 802.11, and the second transceiver may be configured for communications in accordance with BLUETOOTH®. The first connection may be a wireless local area network (WLAN) infrastructure connection, and the second connection may be a WiFi Peer-to-Peer (P2P) connection.

20 Claims, 11 Drawing Sheets

(56) References Cited

U.S. PATENT DOCUMENTS

| | | |
|---|---|---|
| 2005/0135286 A1 | 6/2005 | Nurminen et al. |
| 2005/0147071 A1 | 7/2005 | Karaoguz et al. |
| 2006/0221846 A1 | 10/2006 | Dyck et al. |
| 2006/0274745 A1 | 12/2006 | Wang et al. |
| 2007/0124244 A1* | 5/2007 | Mock et al. .................. 705/50 |
| 2008/0013539 A1 | 1/2008 | Poyhonen et al. |
| 2010/0189117 A1 | 7/2010 | Gowda et al. |
| 2011/0026504 A1 | 2/2011 | Feinberg |
| 2011/0082939 A1 | 4/2011 | Montemurro et al. |
| 2011/0134894 A1 | 6/2011 | Stacey |
| 2011/0149806 A1 | 6/2011 | Verma et al. |
| 2011/0188391 A1 | 8/2011 | Sella et al. |
| 2011/0299422 A1 | 12/2011 | Kim et al. |
| 2012/0051346 A1 | 3/2012 | Herbert et al. |

OTHER PUBLICATIONS

European Search Report & Written Opinion for EP patent application # 12164555, Sep. 26, 2012.

Sethom et al., "Distributed Virtual Network Interfaces to Support Intra-PAN and PAN-to-Infrastructure Connectivity", Global Telecommunications Conference, 2005, Globecom '05, IEEE, Nov. 28-Dec. 2, 2005, Piscataway, NJ, USA, IEEE.

* cited by examiner

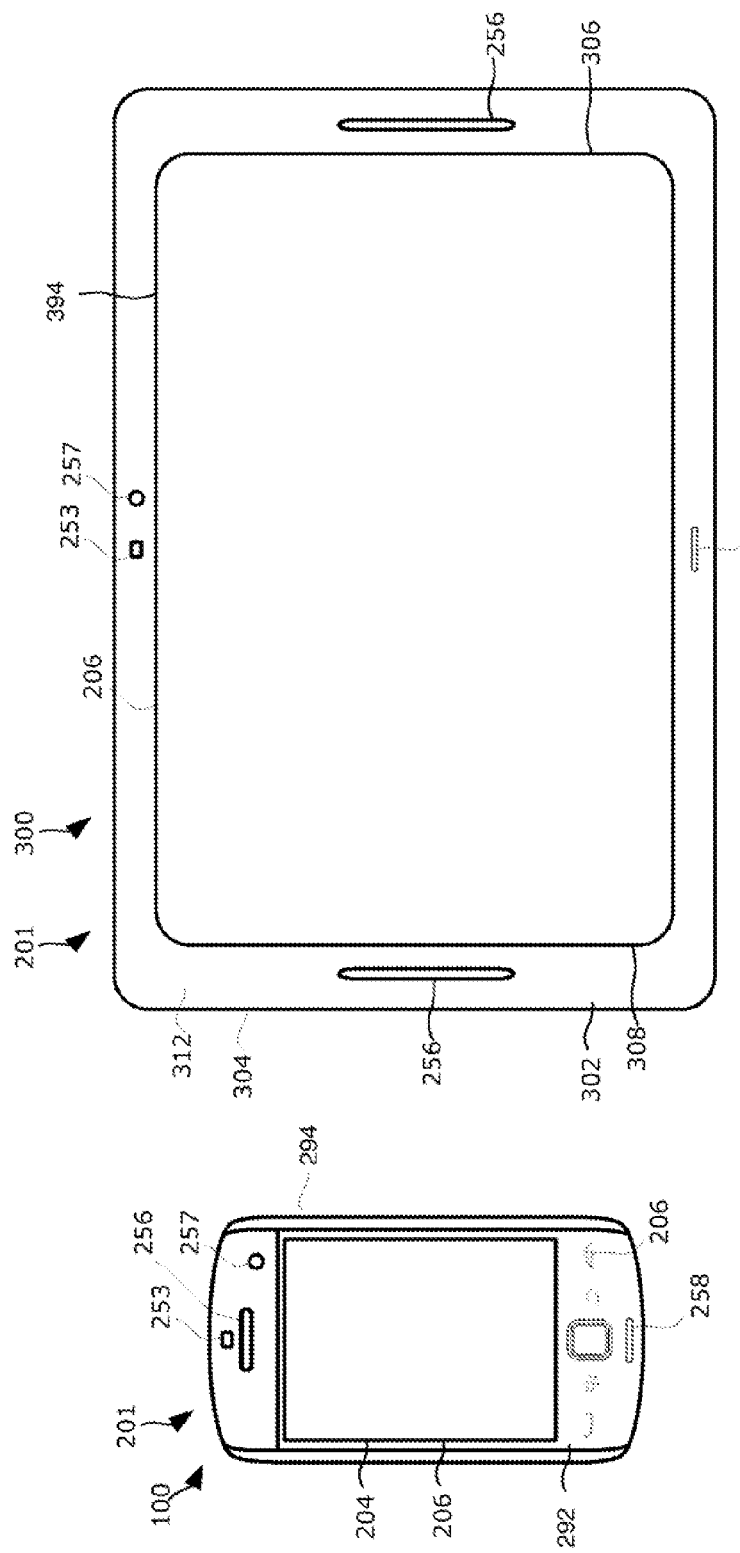

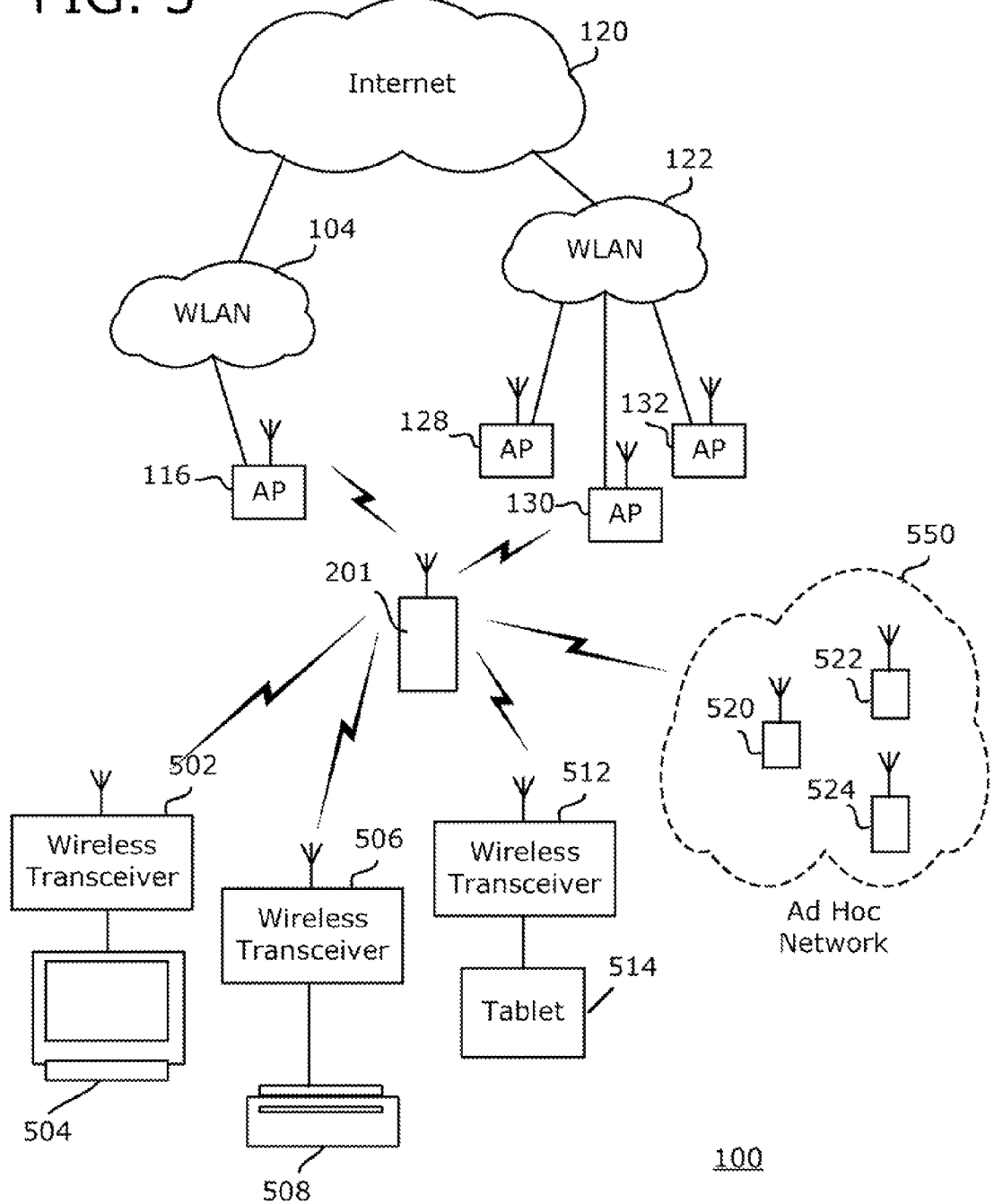

METHODS AND APPARATUS FOR USE IN FACILITATING COMMUNICATIONS OVER FIRST AND SECOND WIRELESS CONNECTIONS OF A WIRELESS TRANSCEIVER

BACKGROUND

1. Field of the Technology

The present disclosure relates generally to communication devices configured for wireless communications, such as IEEE 802.11 type communications, including techniques for facilitating communications over first and second wireless connections of a wireless transceiver.

2. Description of the Related Art

A wireless communication device, such as a portable battery-powered wireless telephony device, may be configured to communicate in wireless communication networks. For example, such a device may communicate via access points (APs) of wireless local area networks (WLANs) in accordance with IEEE 802.11 standards or the like. Such devices may also communicate using peer-to-peer communication techniques, for example, in accordance with the Wi-Fi Peer-To-Peer (P2P) Technical specification, and/or be certified as a "Wi-Fi Direct" device.

There is a need for efficiently facilitating communications in these and similar environments.

BRIEF DESCRIPTION OF THE DRAWINGS

Embodiments of present disclosure will now be described by way of example with reference to attached figures, wherein:

FIGS. 3 and 4 are some examples of different types of wireless devices of the present disclosure, which include a smartphone (FIG. 3) and a tablet computer (FIG. 4);

FIG. 5 is an illustrative representation of a part of the communication system of FIG. 1 which may include different types of wireless networks (e.g. WLAN, and Wi-Fi Peer-to-Peer (P2P) networks);

DETAILED DESCRIPTION OF THE PREFERRED EMBODIMENTS

A wireless communication device of the present disclosure includes a first wireless transceiver and a second wireless transceiver. The wireless device is configured for communicating via the first wireless transceiver over a first wireless connection with a first device, where communications to and from the wireless device are addressed with a first (universally administered) hardware address assigned to the first wireless transceiver. The wireless device is further configured for communicating via the first wireless transceiver over a second wireless connection with a second device, where communications to and from the wireless device are addressed with a second (universally administered) hardware address assigned to the second wireless transceiver. The first and second hardware addresses may be Media Access Control (MAC) addresses of the first and the second wireless transceivers, respectively. In some embodiments, the first wireless transceiver may be configured for communications in accordance with an IEEE 802.11 standard, and the second wireless transceiver may be configured for communications in accordance with a BLUETOOTH® standard. The first wireless connection may be a wireless local area network (WLAN) infrastructure (or WLAN-STA) connection, and the second wireless connection may be a WiFi Peer-to-Peer (P2P) connection. Thus, in some embodiments, the wireless device may utilize the MAC address of the IEEE 802.11 transceiver for identifying the device in association with WLAN-STA connections of the IEEE 802.11 transceiver, and utilize the MAC address of the BLUETOOTH transceiver for identifying the device in association with Wi-Fi P2P connections of the IEEE 802.11 transceiver. The first and the second wireless connections may be concurrent wireless connections.

Example Environment

Figure 1:
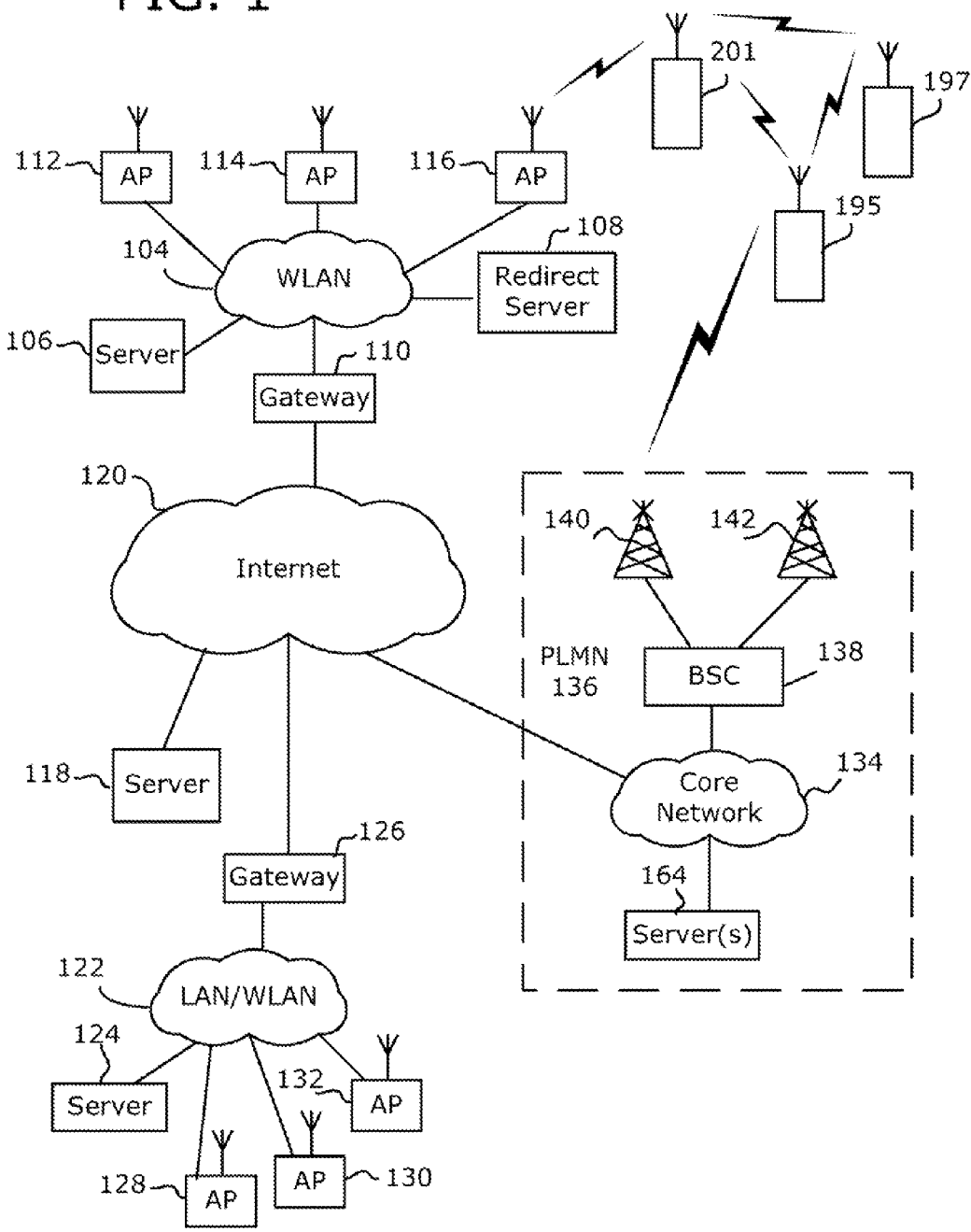
FIG. 1 is an illustrative representation of a communication system which includes wireless communication networks (e.g. WLANs) with which a wireless communication device may communicate.

To illustrate one environment within which the techniques of the present disclosure may be practiced, FIG. 1 illustrates a wireless communication device 201 which may communicate in a communication system 100. In the communication system 100, wireless device 201 may communicate with one or more wireless communication networks. For example, wireless device 201 may communicate with a wireless communication network 104 which is a wireless local area network (WLAN). Here, wireless network 104 and wireless device 201 may operate in accordance with IEEE 802.11 standards.

In this example, wireless network 104 has a plurality of wireless access points (APs) 112, 114, and 116 for wireless communications with wireless device 201. WLANs may be identified by a wireless device 201 with use of a wireless network identifier which is communicated from the WLAN. The wireless network identifier may be, for example, a Set Service Identifier (SSID) or Extended SSID (ESSID). In this example, wireless network 104 includes one or more servers 106, a redirect server 108, and a gateway 110. Server 106 may provide data, applications, and/or functionality for communication services for wireless device 201.

Wireless network 104 may be a public Wi-Fi "hotspot" for public use, and include what may be referred to as a "captive portal" or "walled garden." For devices connected in wireless network 104 via one of wireless APs 112, 114, and 116, gateway 110 is configured to permit or deny access to the data, applications, and/or functionality, as well as to permit or deny external access outside of wireless network 104 to Internet 120. To do this, gateway 110 has a set of IP address filters which define a set of addresses that are permissible/impermissible, if any at all, for access by devices. Access by a device depends on whether or not a device has been authorized and what access rights are given upon authorization.

Typically, when a request by a device in wireless network 104 is made prior to proper authorization, gateway 110 is configured to redirect the request to redirect server 108. In response, redirect server 108 is configured to respond to wireless device 201 to provide data for producing information (e.g. Web page information) which is rendered in a visual display of wireless device 201 via a Web browser application. The information may solicit a user response. For example, the information may solicit a user registration or login with user fields for entering a user name and/or password information. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of wireless network 104.

Wireless device 201 may also operate for communications in other different wireless networks, such as a wireless network 122 which is also a WLAN. In this example, wireless network 122 is a private communication network of an enterprise (e.g. an organization, a company, a corporation, etc.) of wireless device 201. Similar to wireless network 104, wireless network 122 has a plurality of wireless APs 128, 130 and 132, one or more servers 124, and a gateway 126. For devices connected in wireless network 122 via one of wireless APs 128, 130, and 132, gateway 126 may be configured to permit or deny access to the data, applications, and/or functionality offered via wireless network 122 depending on whether or not a device has been authorized and what access rights are given upon authorization. For devices attempting to access wireless network 122 via Internet 120, gateway 126 is configured to permit or deny internal access to the data, applications, and/or functionality in wireless network 122.

Such wireless networks (e.g. infrastructure WLANs) may provide or allow access to various data and communication services to its terminals. For example, the wireless networks may provide for communication access to Internet 120 via the Web browser application, or voice telephony communication service with use of Voice over IP (VoIP) communication, or other communication services. For "push-type" data or message synchronization services, for example, wireless device 201 may be enabled to maintain data synchronization with a server (e.g. server 106 or 118) for user data of an application associated with a user account. The application of wireless device 201 and the server may be or include, for example, an electronic mail (e-mail) application program for the communication of e-mail messages.

Wireless device 201 may be additionally configured to access communication services via a Public Land Wireless Network (PLMN) 136 (e.g. a cellular telecommunications network). PLMN 136 includes a core network 134, a plurality of base station controllers such as a base station controller (BSC) 138 coupled to core network 134, and a plurality of base stations such as a base station (BS) 140 and a base station 142 coupled to associated BSCs 138. Core network 134, BSC 138, and BS 140 operate in a conventional fashion as well-documented. Other PLMNs in the environment have a similar or the same architecture as PLMN 136. For communication with PLMNs, wireless device 201 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), wireless device 201 may additionally or alternatively communicate using peer-to-peer communication techniques, for example, in accordance with the Wi-Fi Peer-To-Peer (P2P) Technical specification, and/or be certified as a "Wi-Fi Direct" device. The Wi-Fi Peer-To-Peer (P2P) Technical specification is hereby incorporated by reference herein.

Accordingly, illustrating further in FIG. 1, wireless device 201 and one or more other wireless devices 195 and 197 in FIG. 1 may be operative to establish Wi-Fi P2P wireless network connections with each other in a Wi-Fi P2P wireless network. Here, one of the communicate devices may be configured to enter into an AP mode of operation, so that other communication devices may associate with them for direct RF communications therebetween. An AP mode of operation, which may be referred to as a "wireless AP mode" or the like, provides a benefit due to the high data rates available over WLAN links. Here, again, data may be communicated directly between the wireless devices without the data traversing any wireless network infrastructure, where one of the devices is set to operate or serve as an AP (switching operation from as an end terminal) and the other device operates as an end terminal to associate and connect with the AP (i.e. wireless device 201 operating as an AP) for communications. Wireless device 201 may operate such that, when in the AP mode of operation with other communication devices 195 and 197, it also operates as a client with another AP.

Figure 2:
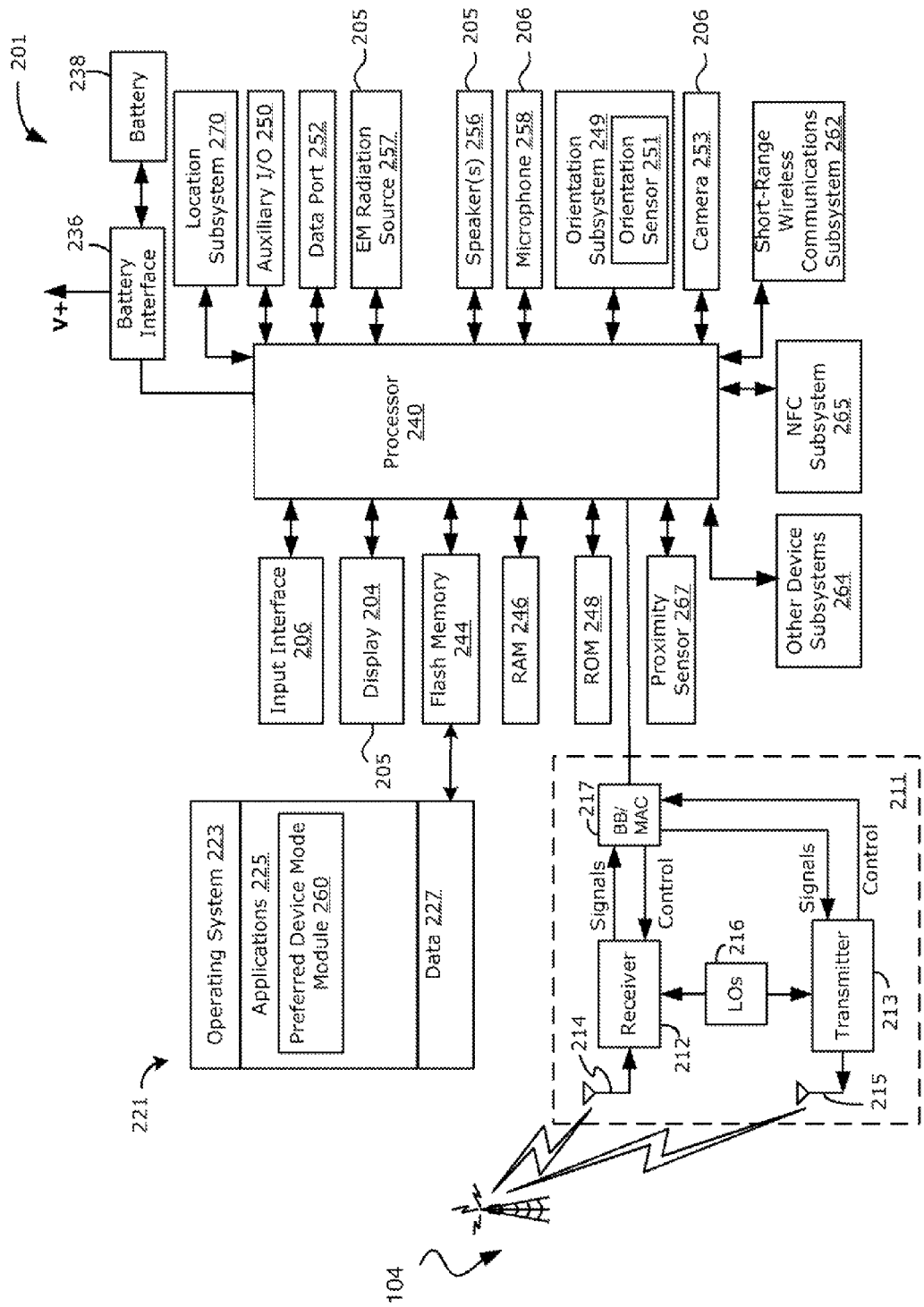
FIG. 2 is an example of a schematic block diagram of the wireless device of FIG. 1.

Reference will now be made to FIG. 2 which illustrates one example of a schematic block diagram of wireless device 201 in which example embodiments may be applied. In the illustrated example embodiment, wireless device 201 is a communication device and, more particularly, is a mobile communication device having data and voice communication capabilities, and configured to communicate with other computer systems (e.g. via the Internet). It will, however, be appreciated that wireless device 201 may take other forms.

Depending on the functionality provided by wireless device 201, in various example embodiments wireless device 201 may be a multiple-mode communication device configured for both data and voice communication, a mobile telephone, such as a smartphone, a wearable computers such as a watch, a tablet computer such as a slate computer, a personal digital assistant (PDA), or a computer system. Wireless device 201 may take other forms apart from those specifically listed above. The electronic device may also be referred to as a mobile communications device, a communication device, a mobile device and, in some cases, as a device.

Wireless device 201 includes a controller including one or more processor 240 (such as a microprocessor) which controls the overall operation of wireless device 201. The processor 240 interacts with device subsystems such as a wireless communication subsystem 211 for exchanging radio frequency signals with wireless network 104 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch-screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 2 perform communication-related functions, whereas other subsystems may provide "resident" or on-device functions.

In at least some example embodiments, wireless device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a frame 312 (of FIG. 3) which surrounds the display 204. In such example embodiments, the frame 312 (of FIG. 3) may be referred to as an active frame since it is capable of acting as an input interface 206. In at least some example embodiments, the touch-sensitive overlay may extend to the sides of wireless device 201.

As noted above, in some example embodiments, wireless device 201 may include a communication subsystem 211 which allows wireless device 201 to communicate over wireless network 104. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to wireless device 201 and a single antenna may be shared by both receiver and transmitter. The particular design of the wireless communication subsystem 211 depends on wireless network 104 in which wireless device 201 is intended to operate.

In at least some example embodiments, wireless device 201 may communicate with any one of a plurality of stations or access points (APs) of wireless network 104 within its geographic coverage area. Wireless device 201 may send and receive communication signals over wireless network 104 after the required network registration or activation procedures have been completed. Signals received by the antenna 214 through wireless network 104 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 21.7. These DSP-processed signals are input to the transmitter 213 for digital-to-analog (D/A) conversion, frequency up conversion, filtering, amplification, and transmission to wireless network 104 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. Wireless device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on wireless device 201 such as receipt of an electronic communication or incoming phone call, or for other purposes such as haptic feedback (touch feedback).

The data port 252 may be used for synchronization with a user's host computer system (not shown). The data port 252 enables a user to set preferences through an external device or software application and extends the capabilities of wireless device 201 by providing for information or software downloads to wireless device 201 other than through wireless network 104. The alternate download path may for example, be used to load an encryption key onto wireless device 201 through a direct, reliable and trusted connection to thereby provide secure device communication.

In at least some example embodiments, wireless device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of wireless device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

Wireless device 201 may, in at least some example embodiments, include a near field communications (NFC) subsystem 265. The NFC subsystem 265 is configured to communicate with other wireless devices 201 and/or tags, using an NFC communications protocol. NFC is a set of short-range wireless technologies which typically require a distance of 4 cm or less for communications. The NFC subsystem 265 may include an NFC chip and an NFC antenna.

Wireless device 201 may include a microphone and/or one or more speakers. In at least some example embodiments, wireless device 201 may include a plurality of speakers 256. For example, in some example embodiments, wireless device 201 may include two or more speakers 265. The two or more speakers 256 may, for example, be disposed in spaced relation to one another. That is, in at least some example embodiments, wireless device 201 may include a first speaker and a second speaker and the first speaker and the second speaker may be spatially separated from one another within wireless device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some example embodiments, each speaker 256 may be associated with a separate audio channel. The multiple speakers may, for example, be used to provide stereophonic sound (which may also be referred to as stereo).

Wireless device 201 may also include one or more cameras 253. The one or more cameras 253 may be capable of capturing images in the form of still photographs or motion video. In at least some example embodiments, wireless device 201 includes a front facing camera 253. A front facing camera is a camera which is generally located on a front face of wireless device 201. The front face is typically the face on which a display 204 is mounted. That is, the display 204 is configured to display content which may be viewed from a side of wireless device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of wireless device 201 and/or the housing of wireless device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, wireless device 201 includes an electromagnetic (EM) radiation source 257. In at least some example embodiments, the EM radiation source 257 is configured to emit electromagnetic radiation from the side of the electronic device which is associated with a camera 253 of that wireless device 201. For example, where the camera is a front facing camera 253, wireless device 201 may be configured to emit electromagnetic radiation from the front face of wireless device 201. That is, in at least some example embodiments, the electromagnetic radiation source 257 is configured to emit radiation in a direction which may visible by the camera. That is, the camera 253 and the electromagnetic radiation source 257 may be disposed on wireless device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, wireless device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their wireless device 201 to the host computer system via a USB cable or Bluetooth® connection, traffic that was destined for wireless network 104 is automatically routed to wireless device 201 using the USB cable or Bluetooth® connection. Similarly, any traffic destined for wireless network 104 is automatically sent over the USB cable Bluetooth® connection to the host computer system for processing.

Wireless device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in wireless device 201, and the battery interface 236 provides a mechanical and electrical connection for the battery 238. The battery interface 236 is coupled to a regulator (not shown) which provides a regulated voltage V to the circuitry for powering wireless device 201.

Wireless device 201 includes a short-range communication subsystem 262 which provides for wireless communication between wireless device 201 and other wireless devices 201. The short-range communication subsystem 262 may be used to provide a preferred device mode between wireless device 201 and another wireless device 201 which may, in at least some example embodiments, be a wireless device which is the same or similar to wireless device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices.

Wireless device 201 stores data 227 in an erasable persistent memory, which in one example embodiment is the flash memory 244. In various example embodiments, the data 227 includes service data including information required by wireless device 201 to establish and maintain communication with wireless network 104. The data 227 may also include user application data such as email messages, address book and contact information, calendar and schedule information, notepad documents, image files, and other commonly stored user information stored on wireless device 201 by its user, and other data. The data 227 stored in the persistent memory (e.g. flash memory 244) of wireless device 201 may be organized, at least partially, into one or more databases or data stores. The databases or data stores may contain data items of the same data type or associated with the same application. For example, email messages, contact records, and task items may be stored in individual databases within the device memory.

Wireless device 201 may, in some example embodiments, be a mobile communication device which may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of wireless device 201 may also compose data items, such as email messages; for example, using the input devices in conjunction with the display 204. These composed items may be transmitted through the communication subsystem 211 over wireless network 104.

In the voice communication mode, wireless device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on wireless device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such as preferred device mode module 260. In the example embodiment of FIG. 1, the preferred device mode module 260 is implemented as a stand-alone application 225. However, in other example embodiments, the preferred device mode module 260 could be implemented as part of the operating system 223 or another application 225.

The software applications 225 on wireless device 201 may also include a range of additional applications, including for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on wireless device 201 during or after manufacture. Additional applications and/or upgrades to the operating system 223 or software applications 225 may also be loaded onto wireless device 201 through wireless network 104, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Example Smartphone Electronic Device

Referring now to FIG. 3, a front view of an example wireless device 201 which is a smartphone 100 is illustrated. The smartphone 100 is a mobile phone which offers more advanced computing capability than a basic non-smartphone cellular phone. For example, the smartphone 100 may have the ability to execute third party applications which are stored on the smartphone.

The smartphone 100 may include the components discussed above with reference to FIG. 2 or a subset of those components. The smartphone 100 includes a housing 294 which houses at least some of the components discussed above with reference to FIG. 2.

In the example embodiment illustrated, the smartphone includes a display 204, which may be a touchscreen display which acts as an input interface 206. The display 204 is disposed within the smartphone 100 so that it is viewable at a front side 292 of the smartphone 100. That is, a viewable side of the display 204 is disposed on the front side 292 of the smartphone. In the example embodiment illustrated, the display 204 is framed by the housing 294.

The example smartphone 100 also includes other input interfaces 206 such as one or more buttons, keys or navigational input mechanisms. In the example illustrated, at least some of these additional input interfaces 206 are disposed for actuation at the front side 292 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 3 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 3).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of and/or surrounding the front side of the smartphone 100.

The example smartphone 100 also includes an electromagnetic radiation source 257. The electromagnetic radiation source 257 is disposed on the front side 292 of the smartphone 100. In this orientation, electromagnetic radiation which is produced by the electromagnetic radiation source 257 may be projected onto objects which are located in front of and/or surrounding the front side of the smartphone 100. Such electromagnetic radiation (or the projection of electromagnetic radiation onto objects) may be captured on images obtained by the camera 253.

Example Tablet Electronic Device

The wireless device may be a tablet computer 300 ("tablet"), one of which is illustrated in FIG. 4. Tablet computer 300 of FIG. 4 may include many of the same features and components of the smartphone 100 of FIG. 3. However, tablet computer 300 of FIG. 3 is generally larger than the smartphone 100 of FIG. 3. Tablet computer 300 may include the components discussed above with reference to FIG. 2 or a subset of those components. Tablet computer 300 includes a housing 394 which houses at least some of the components discussed above with reference to FIG. 2.

Tablet computer 300 includes a display 304, which may be a touchscreen display which acts as an input interface 206. The display 304 is disposed within tablet computer 300 so that it is viewable at a front side 302 of tablet computer 300. That is, a viewable side of the display 304 is disposed on the front side 302 of tablet computer 300. In the example embodiment illustrated, the display 304 is framed by the housing 394, with use of a frame 312 which surrounds the display 304. The frame 312 is portion of the housing 394 which provides a border around the display 304. In at least some example embodiments, the frame 312 is an active frame 312. That is, the frame has a touch sensitive overlay which allows wireless device 201 to detect a touch applied to the frame, thereby allowing the frame 312 to act as an input interface 206 (of FIG. 1).

The example tablet computer 300 includes a plurality of speakers 256. In the example embodiment illustrated, the tablet includes two speakers 256. The two speakers 256 are disposed on opposing sides of the display 304. More particularly, when tablet computer 300 is held in a landscape orientation (such as the orientation illustrated in FIG. 3) where its width is longer than its height, one of the two speakers is disposed on a right side 306 of the display 304 and one of the speakers is disposed on the left side 308 of the display 304. Both speakers 256 are disposed on the front side 302 of tablet computer 300.

The example tablet computer 300 also includes a microphone 258. In the example illustrated, the microphone 258 is vertically disposed below the display 304 when the tablet computer is held in the landscape orientation illustrated in FIG. 4. The microphone 258 may be located in other locations in other example embodiments.

The example tablet computer 300 also includes a front facing camera 253 which may be located vertically above the display 304 when tablet computer 300 is held in a landscape orientation (i.e. the orientation of FIG. 3). The front facing camera 253 is located so that it may capture images of objects which are located in front of and/or surrounding the front side of tablet computer 300.

The example tablet computer 300 also includes an electromagnetic radiation source 257. The electromagnetic radiation source 257 is disposed on the front side 304 of tablet computer 300. In this orientation, electromagnetic radiation which is produced by the electromagnetic radiation source 257 may be projected onto objects which are located in front of and/or surrounding the front side 302 of tablet computer 300. Such electromagnetic radiation (or the projection of electromagnetic radiation onto objects) may be captured on images obtained by the camera 253.

Although a specific wireless device 201 has just been described, any suitable wireless communication device or terminal may be part of the methods and apparatus which will be described in fuller detail below. Also, although the description of the architecture relates to a specific example for illustration, where the wireless network or WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Example Wireless Network Configurations/Connections

FIG. 5 is an illustrative representation of a part of the communication system 100 of FIG. 1, which illustrates different types of wireless network configurations which may involve wireless device 201. Wireless networks 104 and 122 are WLANs of the traditional "WLAN infrastructure" type, which typically provide for external network connectivity, as described earlier in relation to FIG. 1. For example, wireless networks 104 and 122 are configured to provide or facilitate access to the Internet 120 (or other communication network, such as a public communication network) for wireless device 201 when connected therewith. In this case, wireless device 201 may make use of its WLAN profiles for connecting with such WLANs.

Other wireless networking configurations include Wi-Fi peer-to-peer (P2P) wireless networking configurations. For example, in FIG. 5 it is shown that wireless device 201 may establish a Wi-Fi P2P wireless connection with a display device 504 (or monitor) which includes a wireless transceiver 502. Such Wi-Fi P2P wireless network connection may be suitable for applications such as, for example, a streaming media application, or a display or presentation application.

It is also shown that wireless device 201 may establish a Wi-Fi P2P wireless network connection with a printer device 508 which includes a wireless transceiver 506. Such Wi-Fi P2P wireless network connection may be suitable for applications such as, for example, a print application or a facsimile application.

Even further, it is shown that wireless device 201 may establish a Wi-Fi P2P wireless network connection with a tablet 514 which includes a wireless transceiver 512. An example tablet was previously shown and described in relation to FIG. 4. Such Wi-Fi P2P wireless network connection may be suitable for an applications such as, for example, a "bridge" or "bridging" application, where wireless device 201 is further configured for cellular telecommunications (e.g. equipped with a cellular transceiver) but tablet 514 is not. In such application, tablet 514 is able to achieve external network (e.g. Internet) connectivity, being connected to wireless device 201 for communications via the cellular telecommunication network.

It is further shown in FIG. 5 that wireless device 201 may establish a Wi-Fi P2P wireless network connection in an ad hoc wireless network 550 which includes one or more other wireless devices 520, 522, and 524. Such Wi-Fi P2P wireless network connection may be suitable for applications such as, for example, a file sharing application, a conference meeting application, a game or gaming application, or a military application. In many instances, such ad hoc wireless networks provide no external network connectivity.

When wireless device 201 is connected as such, using one or more Wi-Fi P2P wireless network connections, data may be communicated "directly" between wireless device 201 and the other devices (i.e. without the data traversing any fixed wireless network infrastructure).

Profiles for Applications which Make Use of Wi-Fi P2P Wireless Connections.

As described earlier, wireless device 201 has different types of applications stored therein. These applications may include, as examples, a messaging application, a voice telephony application, a Web browsing application, a streaming media application, a file sharing application, a game application, a printer application, a facsimile application, a display or presentation application, a military application, as examples. Wireless device 201 is optimized to establish the appropriate wireless networks based on which type of application is invoked.

Figure 6:
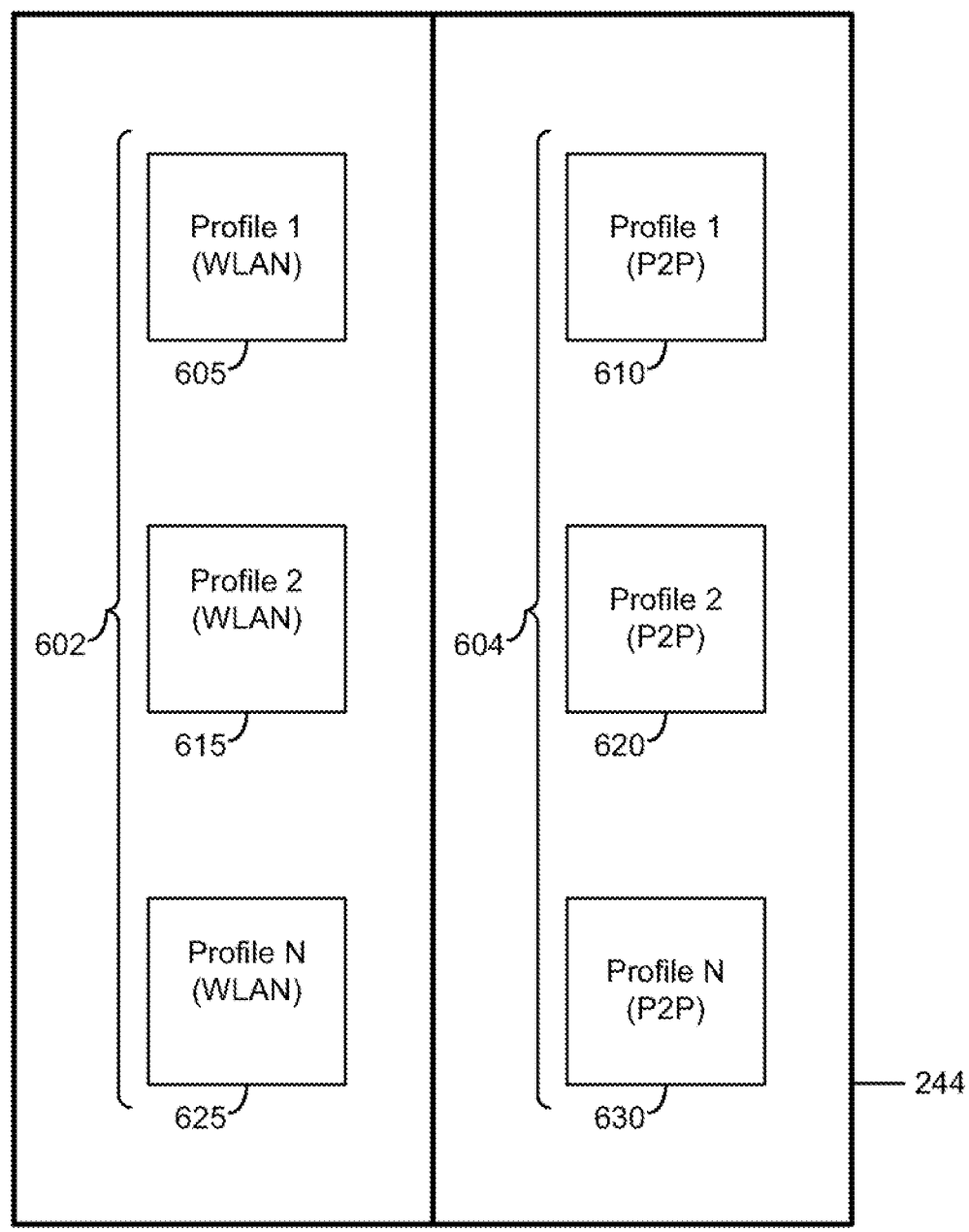
FIG. 6 is an illustrative representation of a portion of memory of the wireless device, where the memory has a plurality of profiles stored therein where each profile is associated with a first type of wireless connection (e.g. a WLAN-STA type of wireless connection) or a second type of wireless connection (e.g. a Wi-Fi P2P type of wireless connection)

Referring ahead to FIG. 6, an illustrative representation of another portion of memory 224 of wireless device 201 is shown. Memory 224 is shown to store a plurality of profiles for wireless networking. The profiles include one or more profiles 602 associated with WLAN infrastructure networks, and/or one or more profiles 604 associated with applications and/or services which utilize Wi-Fi P2P wireless network connections. In FIG. 6, profiles 602 are shown to include profiles 605, 615, and 625, whereas profiles 604 are shown to include profiles 610, 620, and 630. Profiles 602 may be or be referred to as WLAN profiles, whereas profiles 604 may be or be referred to as Wi-Fi P2P wireless networking profiles or Wi-Fi Direct profiles.

Each one of profiles 602 is associated with a particular WLAN infrastructure network, and includes a plurality of parameters and/or properties for accessing the particular WLAN. The WLAN information may include an identification which identifies the WLAN to access (e.g. a SSID or ESSID). The WLAN information may also include authentication and/or security information for obtaining access to the WLAN (e.g. a network key, passkey, security key, etc.). One of the WLANs appropriate WLAN from profiles 602 will be selected for communication when available, as prioritized in a prioritized list of the profiles 602. When not connected in a WLAN, the wireless device normally operates to search for WLANs identified in its stored profiles 602. Conversely, the wireless device normally refrains from searching for and communicating in WLANs other than those WLANs identified in stored profiles 602.

On the other hand, each one of profiles 604 is associated with one of the applications and/or services which utilizes a particular type and/or configuration of Wi-Fi P2P wireless network (or Wi-Fi Direct network). Each one of profiles 604 includes parameters and/or properties associated with establishing the particular type and/or configuration of Wi-Fi P2P wireless network for the application and/or service. Profiles 604 may be created, viewed, updated, enabled, and disabled, as described in the present disclosure (see e.g. discussion in relation to FIG. 10).

Properties in profiles 604 may include the following. Properties may include a device type property which indicates a device type of the device for the Wi-Fi P2P wireless network connection to be established. The device type may be the device type that is being searched for in the discovery. Note that there may be two device types specified in the profile: a primary device type and a secondary device type. The device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The device type may be or include category identification (ID) and/or subcategory identification (ID). Examples of such types are as follows: a computer, an input device, a printer, a camera, a display (monitor), a gaming device, an audio device, a multimedia device, or a telephone device.

Properties may additionally or alternatively include an advertised device type property which indicates the device type of wireless device 201. The advertised device type may be the device type to be advertised by wireless device 201. Note that there may be two advertised device types specified in the profile: a primary advertised device type, and a secondary advertised device type. The advertised device types may be or include the appropriate device types in the Wi-Fi Direct Network as described in the Wi-Fi Peer-To-Peer (P2P) Technical specification (e.g. in Annex B thereof). The device types may be or include the predefined values as set forth therein. The advertised device type may be or include category identification (ID) and/or subcategory identification (ID). Examples of such types are as follows: a computer, an input device, a printer, a camera, a display (monitor), a gaming device, an audio device, a multimedia device, or a telephone device.

Properties in profiles 604 may additionally or alternatively include a service type property which indicates a service type which identifies the service associated with the device. For example, the service types may be or include the appropriate service types as described in the Wi-Fi Peer-To-Peer (P2P) Technical specification (e.g. in Annex E thereof). Examples of such types are as follows: a file sharing service, or a printing service. Alternatively, examples of such types are as follows: Apple File Sharing (AFP) service (or AFP over TCP service), or IP Printing (IPP) Bonjour service.

Properties in profiles 604 may additionally or alternatively include a discovery mode property which indicates a mode utilized for the discovery of devices for the Wi-Fi P2P wireless network connection. The discovery mode property may be set to one of the following: a triggered mode of discovery, or a periodic mode of discovery. Alternatively, the discovery mode may be set to one of the following: a triggered mode of discovery, a periodic mode of discovery, or a Group Owner (GO) mode of discovery.

Properties in profiles 604 may additionally or alternatively include a persistent property or indication which indicates whether or not the Wi-Fi P2P wireless network is persistent. If the network is persistent, when an application is opened or activated, the wireless device connects to a previously-established Wi-Fi P2P wireless network.

Properties in profiles 604 may additionally or alternatively include a coexistence indication or property which indicates whether the Wi-Fi P2P wireless network connection associated with this profile may be maintained while the wireless device operates as a client in an infrastructure network. Properties may additionally or alternatively include another coexistence indication or property which indicates whether the Wi-Fi P2P wireless network connection associated with this profile may be maintained while maintaining another Wi-Fi P2P wireless network connection.

Note that properties in profiles 604 may omit a device identifier which identifies any particular device for connection, and/or may omit a wireless network identifier which identifies any particular wireless network for connection. Rather, properties in at least some of profiles 604 indicate connection with particular types of devices (and/or services), and/or indicate connection with particular types of networks, as opposed to specifically identified devices, or specifically identified networks.

More on Use Cases; Additional/Alternative Profile Details.

It is noted that many peer-to-peer "use cases" for Wi-Fi P2P wireless networking lend themselves to different modes of operation. For example, if a wireless device supports a network gateway feature (e.g. a mobile hotspot or MHO feature), then the wireless device may be configured to establish a persistent Wi-Fi P2P wireless network when the service is enabled. As another example, the same wireless device may require a printer service to allow an application to print a document. In this case, the Wi-Fi P2P wireless network may be established on-demand based on an application trigger. In another example, a social networking application may periodically search for other communication devices running the same social networking application, which may result in the wireless device operating in a periodic discovery mode for other devices which advertise the same service.

To accommodate for such various use cases, profiles associated with the various application/services utilizing Wi-Fi P2P wireless networks are created and stored on the wireless device. These profiles are enabled when needed, such as enabled in response to an activation of an application associated therewith. Further, the profiles may be enabled concurrently.

In one embodiment, the profiles may have data structures defined for compatibility with the Wi-Fi Peer-To-Peer (P2P) Technical specification. Each profile may include information specific to Wi-Fi P2P wireless network operation, including device discovery behavior, service discovery options, coexistence with infrastructure connectivity, as well as operational characteristics of the network (e.g. whether it is persistent, or triggered on application launch).

These profiles may be provisioned as defaults in the wireless device, and/or may be configured by applications when installed. Further, the profiles may be configured via the user interface of the wireless device with use of a human-machine interface (HMI) application that provides management of the profiles. This HMI application may be configured to provide the ability to search for and identify any Wi-Fi P2P wireless networks.

The profiles are used to manage the behavior of the WLAN or Wi-Fi driver of the wireless device to accommodate for the various application/services. The driver may be configured to support each particular use case. More particularly, the driver may use the profile information to manage peer-to-peer communications on the wireless device, as well as to arbitrate between Wi-Fi P2P wireless network and other modes of connectivity (e.g. infrastructure STA mode). The driver may be further configured to support other application requirements, such as sleep modes, discovery modes, and/or coexistence with an infrastructure network connection over WLAN, etc. An example set of properties and/or parameters relating to the behavioral characteristics were provided earlier above.

Figure 7:
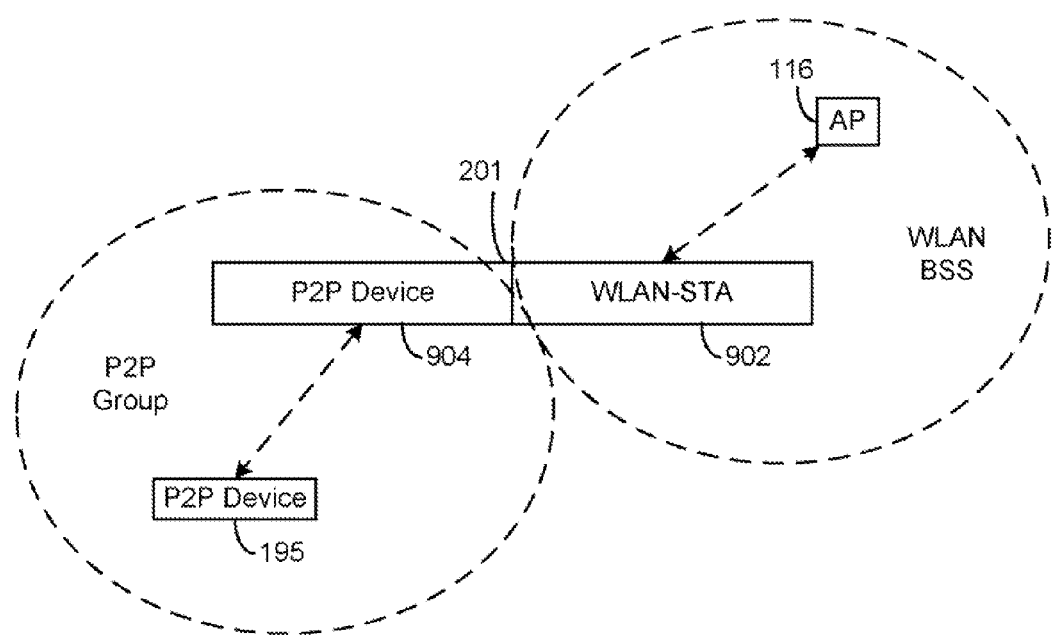
FIG. 7 is a schematic block diagram of relevant components of the wireless device which pertain to communications over first and second wireless connections of a wireless transceiver of the wireless device, especially communications over concurrent wireless connections.

FIG. 7 illustrates that wireless device 201 may operate as a P2P concurrent device in accordance with the Wi-Fi Peer-To-Peer (P2P) Technical specification. In this case, wireless device 201 has a first MAC entity 902 operating as a "WLAN-STA" and a second MAC entity 904 operating as a "P2P Device". Dual MAC functionality may be implemented as, for example, two virtual MAC entities over one physical layer (PHY) entity. Thus, wireless device 201 may operate to concurrently maintain two different types of wireless connections via the same wireless transceiver or PHY entity. However, wireless device 201 may only have a single Media Access Control (MAC) address assigned to the wireless transceiver for identifying communications to and from wireless device 201.

Note that, in section 2.4.3 ("P2P Device addressing") of the Wi-Fi P2P Technical specification, it is described that "[a] P2P Device shall have a P2P Device Address, conforming to the format as described in §7.1.3.3.1 of IEEE Std 802.11-2007 [1], which is used to uniquely reference that P2P Device. The P2P Device Address of a P2P Device shall be its globally administered MAC address, or its globally administered MAC address with the locally administered bit set. The P2P Device Address shall be used as the receiver address (RA) for all frames sent to a P2P Device during P2P Discovery, with the sole exception of using a broadcast receiver address in a Probe Request. The P2P Device Address shall be used as the transmitter address (TA) for all frames sent by a P2P Device during P2P Discovery."

Figure 8:
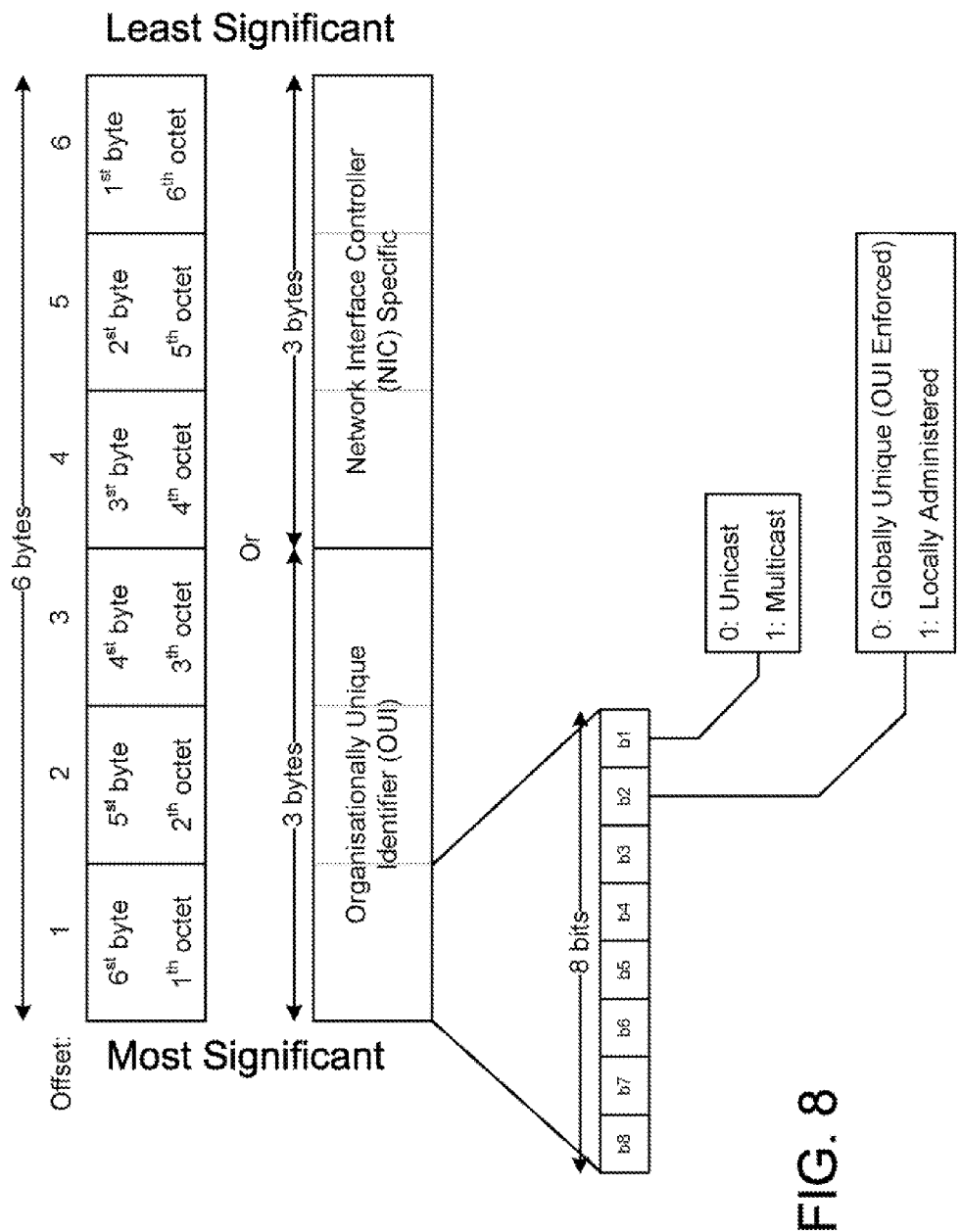
FIG. 8 is an illustration of the format of a Media Access Control (MAC) address which may be utilized for identifying the device for communications.

FIG. 8 is an illustration of a format associated with a hardware address 800 which is a MAC address. The hardware or MAC address may be or be referred to as a layer-2 address of the device. The MAC address is a code that is assigned to an interface of a device, which essentially represents a code for uniquely identifying the device. MAC is used for access to the physical layer from the data link layer according to the ISO/OSI model. Most layer-2 protocols utilize one of three numbering spaces governed by the IEEE: MAC-48, EUI-48, and EUI-64 (where EUI stands for Extended Unique Identifier). They are all designed to be globally unique, even if not all the communication protocols require such feature.

The original IEEE 802 MAC address utilizes MAC-48. With MAC-48, there are $2^{48}$ (i.e., 281,474,976,710,656) possible MAC addresses. In its most common format, the 48-bit code of the MAC address is divided into 12 hex digits. The hexadecimal notation is used at least to differentiate it from IP addresses that use decimal notation. The first 6 hex digits identify the manufacturer of the device, while the later 6 hex digits are the serial number of the device. The MAC address is usually written in 6 octets separated by a hyphen (e.g. 00-50-FC-B0-67-2C), where the first 3 octets are referred to as the Organizationally Unique Identifier (OUI).

An address may either be a "universally administered address" or a "locally administered address". A universally or globally administered address is assigned to the device by its manufacturer and may also be referred to as a "burned-in address." The first three octets (in transmission order) identify the organization or producer that issued the identifier, and represent the OUI. The next three octets (MAC-48 and EUI-48), or five octets (EUI-64), are assigned by the producer only has to respect the constraint of uniqueness. On the other hand, a locally administered address is assigned to a component by a network administrator, overriding the burned-in address. Locally administered addresses do not contain OUIs. Universally administered and locally administered addresses are distinguished by setting the second-least-significant bit of the most significant byte of the address. This bit is also referred to as a Universal/Local (U/L) bit, which identifies how the address is administered. If the bit is "0", the address is universally administered. If the bit is "1", the address is locally administered.

Figure 9:
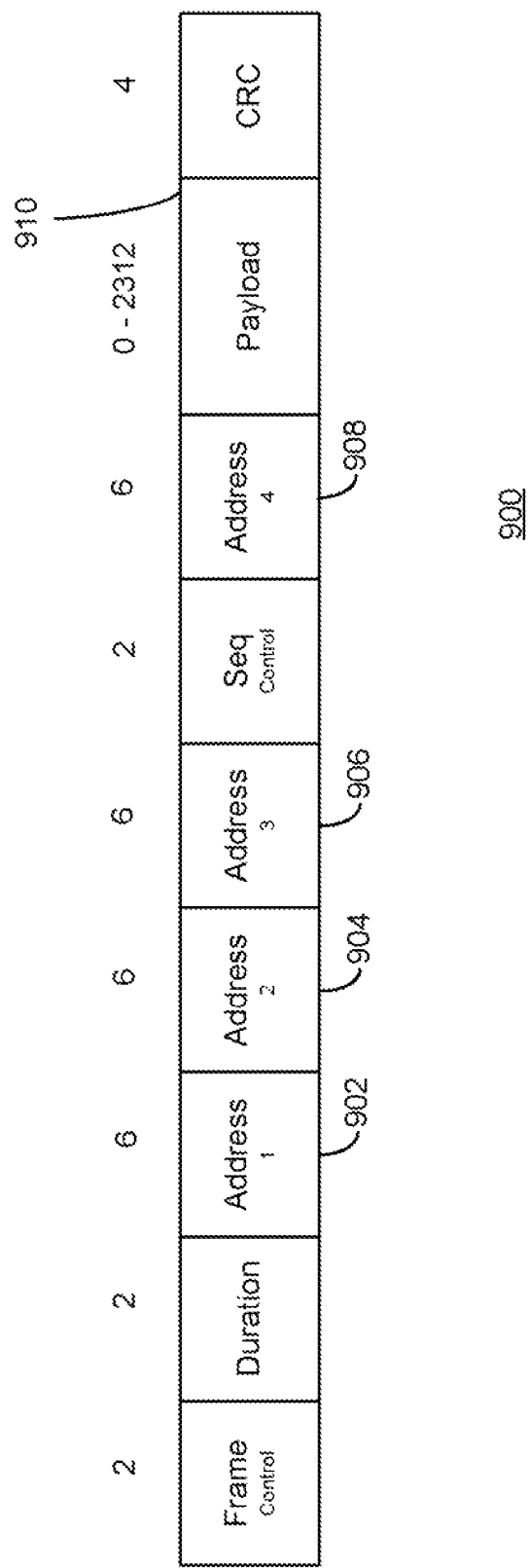
FIG. 9 is an example of a format of a data frame which may be utilized for communications to and/or from the wireless device.

FIG. 9 is an example format of a data frame 900 which may be utilized for communications to and/or from the wireless device of the present disclosure. In this example, data frame 900 has a format suitable for communication in accordance with IEEE 802.11. Data frame 900 includes one or more address fields for the identification of devices associated with the communications, and a payload field 910 for carrying a payload of data. A device may be identified by its hardware address (e.g. its MAC address) (see e.g. FIG. 8). A destination address field 902 is generally populated with a destination address which is the hardware address assigned to the device that is receiving data frame 900. A source address field 904 is generally populated with a source address which is the hardware address assigned to the device that is transmitting data frame 900. Other address fields may be included as well, such as an address field 906 which is populated with the hardware address of the router interface to which the associated AP is attached, and/or an address field 910 which is populated with the hardware address for ad hoc mode.

Figure 10:
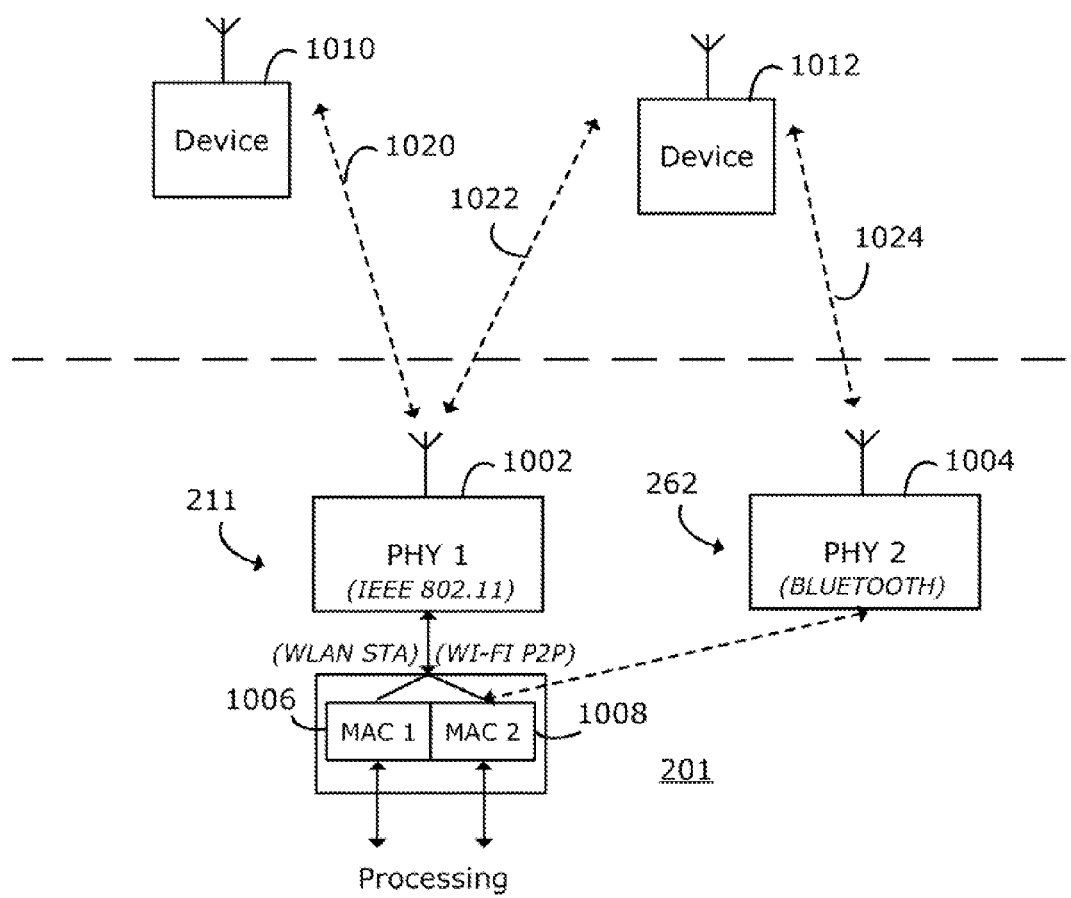
FIG. 10 is another schematic block diagram of relevant components of the wireless device which pertain to communications over first and second wireless connections of the wireless transceiver, which may be concurrent wireless connections, in accordance with techniques of the present disclosure.

FIG. 10 is a block diagram of a portion of relevant components of wireless device 201 which is in communication with other wireless devices 1010 and 1012. In general, wireless device 201 of the present disclosure includes a first wireless transceiver 1002 and a second wireless transceiver 1004 for communications. First wireless transceiver 1002 may represent communication subsystem 211 in FIG. 2, whereas second wireless transceiver 1004 may represent communication subsystem 262 in FIG. 2.

First wireless transceiver 1002 may be operative in accordance with an IEEE 802.11 communication standard. First wireless transceiver 1002 may further be operative in accordance with the Wi-Fi Peer-To-Peer (P2P) Technical specification, such that wireless device 201 is configured to operate as a P2P concurrent device as described earlier above (e.g. in relation to FIG. 7). On the other hand, second wireless transceiver 1004 may be operative in accordance with a BLUETOOTH communication standard.

As illustrated, wireless device 201 is configured for communicating via first wireless transceiver 1002 over a first wireless connection 1020 with a first device 1010 (e.g. a wireless AP of a WLAN). Here, communications to and/or from wireless device 201 are addressed with a first hardware address assigned to first wireless transceiver 1002. The first hardware address may be the universally administered hardware address or MAC address assigned to first wireless transceiver 1002. Wireless device 201 is further configured for communicating via first wireless transceiver 1002 over a second wireless connection 1022 with a second device 1012 (e.g. a Wi-Fi P2P device). Here, communications to and/or from wireless device 201 are addressed with a second hardware address assigned to second wireless transceiver 1004. The second hardware address may be the universally administered hardware address or MAC address assigned to second wireless transceiver 1004.

The first wireless connection 1020 may be a wireless local area network (WLAN) infrastructure connection (where wireless device 201 operates as a WLAN-STA), and the second wireless connection 1022 may be a WiFi Peer-to-Peer (P2P) connection. The first and second wireless connections may be concurrent wireless connections.

Note further that wireless device 201 may be additionally configured for communicating via second wireless transceiver 1004 over a third wireless connection 1024 with second device 1012 or a third device (e.g. a BLUETOOTH device). In this case, communications to and/or from wireless device 201 are addressed with the second hardware address assigned to second wireless transceiver 1004. The third wireless connection 1024 may be a BLUETOOTH connection. Note that the first and the third wireless connections 1020 and 1024 are point-to-point connections.

Figure 11:
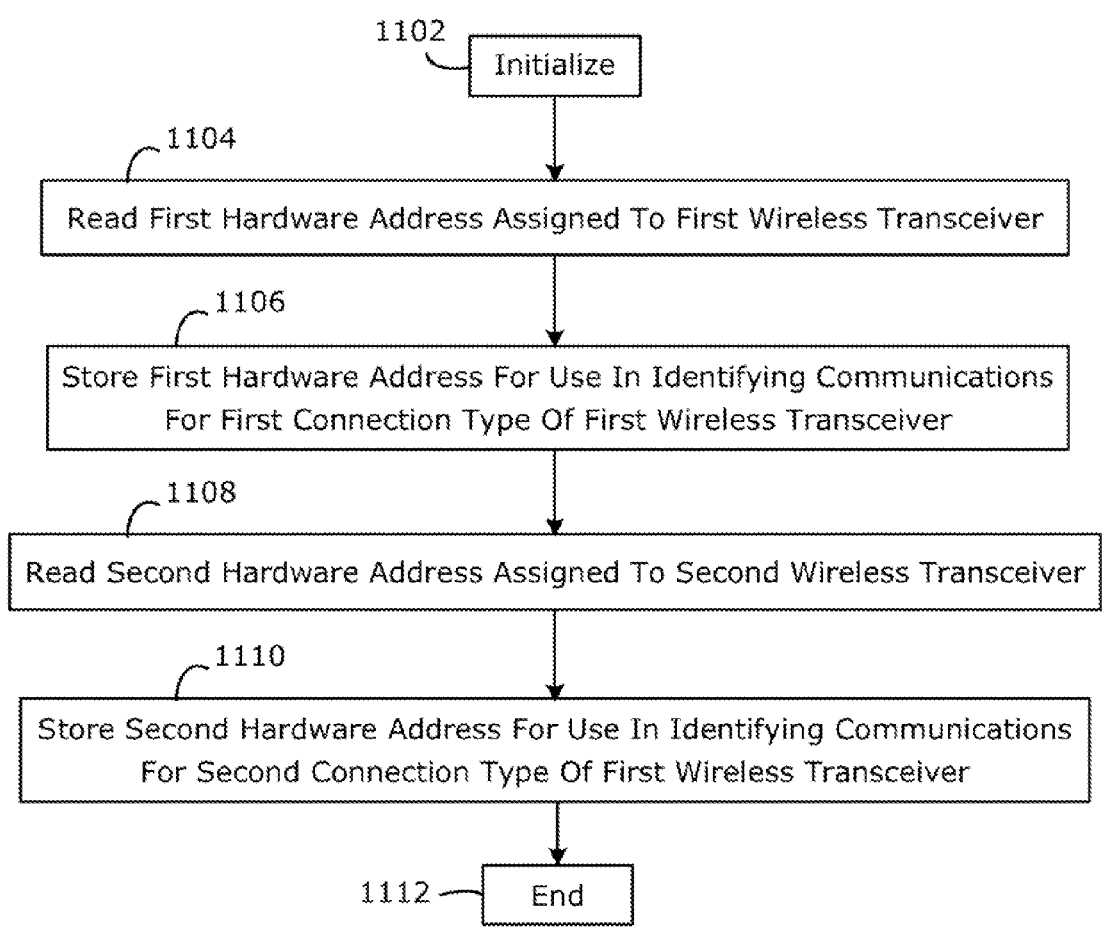
FIG. 11 is a flowchart for describing a method for use in facilitating communications over first and second wireless connections of the wireless transceiver of the wireless device.

FIG. 11 is a flowchart for describing a method for use in facilitating communications over first and second wireless connections of a wireless transceiver. The method of FIG. 11 may be performed by wireless device 201 described in relation to FIGS. 1-10 above, and relates to an initialization procedure of the wireless device. The wireless device includes a first wireless transceiver (e.g. IEEE 802.11) and a second wireless transceiver (e.g. BLUETOOTH). In such technique, the wireless device may operate in accordance with or be compatible with the Wi-Fi P2P wireless network protocols in the Wi-Fi Peer-To-Peer (P2P) Technical specification. Each wireless transceiver may be contained within a hardware transceiver module or chip (e.g. IC) in the wireless device, or alternatively both wireless transceivers may be contained within the same hardware transceiver module or chip. Each module or chip includes a memory for storing one or more hardware addresses assigned to the one or more wireless transceivers.

The techniques described in relation to the flowchart of FIG. 11 may be performed by one or more controllers or processors of the wireless device along with its wireless or RF transceiver(s). A computer program product which may embody the technique may include a computer readable medium (e.g. memory of the communication device, computer disk, CD-ROM, etc.) having computer instructions stored therein which are executable by the one or more processors of the wireless device for performing the technique.

In the technique of FIG. 11, the wireless device performs an initialization procedure for initialization (step 1102 of FIG. 11). This initialization procedure may be performed in response to the wireless device being powered "on" or reset, for example, or from other suitable event or condition. Amongst other initialization tasks, the wireless device reads, from memory of the first wireless transceiver, a first hardware address assigned to the first wireless transceiver (step 1104 of FIG. 11). The wireless device stores this first hardware address in its device memory (e.g. flash memory 244 of FIG. 2) for subsequent use in identifying communications to and/or from the device via the first wireless transceiver for a first type of wireless connection (step 1106 of FIG. 11).

In addition, the wireless device reads, from memory of the second wireless transceiver, a second hardware address assigned to the second wireless transceiver (step 1108 of FIG. 11). The wireless device stores this second hardware address in its device memory (e.g. flash memory 244 of FIG. 2) for subsequent use in identifying communications to and/or from the device via the first wireless transceiver for a second type of wireless connection (step 1110 of FIG. 11). Note further that the wireless device may also store this second hardware address in its device memory (e.g. flash memory 244 of FIG. 2) for subsequent use in identifying communications to and/or from the device via the second wireless transceiver for a third type of wireless connection. The flowchart ends at an end block 1112.

In some embodiments, the first and second hardware addresses are universally administered hardware addresses that are assigned to the first and the second wireless transceivers, respectively. These universally administered hardware addresses may be the MAC addresses assigned to the wireless transceivers during manufacture.

Also, the first wireless transceiver may be configured to communicate in accordance with an IEEE 802.11 communications standard, and the second wireless transceiver may be configured to communicate in accordance with a BLUETOOTH® communications standard. Thus, in some embodiments, the wireless device may utilize the MAC address of the IEEE 802.11 transceiver for identifying communications to and/or from via the IEEE 802.11 transceiver for WLAN-STA connections, and utilize the MAC address of the BLUE- TOOTH transceiver for identifying communications to and/or from via the IEEE 802.11 transceiver for Wi-Fi P2P connections. The wireless device may also utilize the MAC address of the BLUETOOTH transceiver for identifying communications to and/or from the device via the BLUETOOTH transceiver for BLUETOOTH connections. The first and second wireless connections may be concurrent wireless connections.

Figure 12:
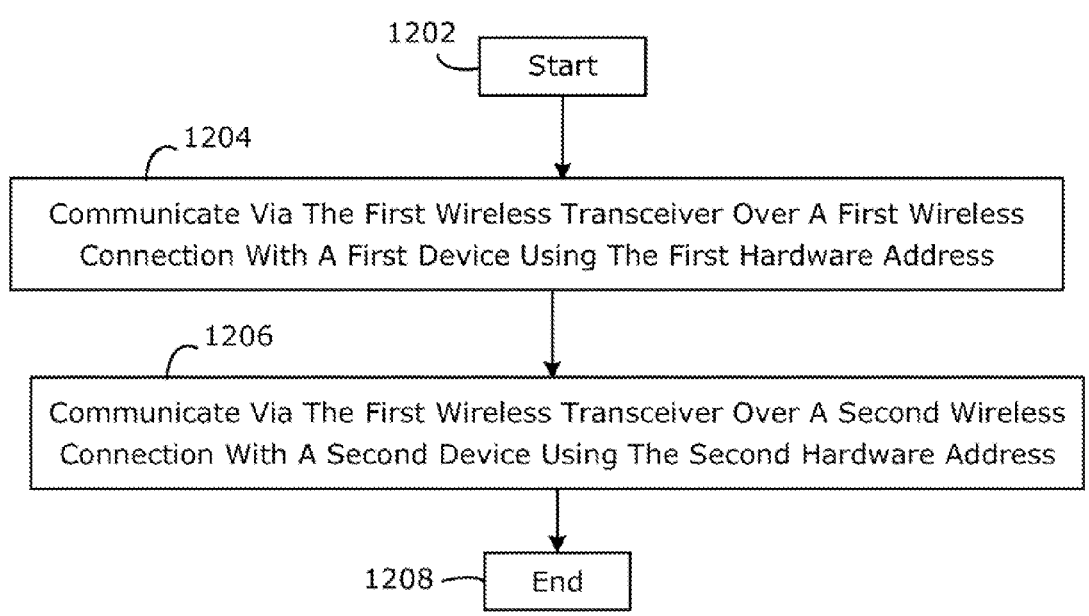
FIG. 12 is another flowchart for describing another method for use in facilitating communications over the first and second wireless connections of the wireless transceiver of the wireless device.

FIG. 12 is another flowchart for describing another method for use in facilitating communications over first and second wireless connections of a wireless transceiver. The method of FIG. 12 may be performed by wireless device 201 described in relation to FIGS. 1-10, with use of or without the technique of FIG. 11. The wireless device includes a first wireless transceiver (e.g. IEEE 802.11) and a second wireless transceiver (e.g. BLUETOOTH). In such technique, the wireless device may operate in accordance with or be compatible with the Wi-Fi P2P wireless network protocols in the Wi-Fi Peer-To-Peer (P2P) Technical specification. Each wireless transceiver may be contained within a hardware transceiver module or chip (e.g. IC) in the wireless device, or alternatively both wireless transceivers may be contained within the same hardware transceiver module or chip. Each module or chip includes a memory for storing one or more hardware addresses assigned to the one or more wireless transceivers.

The techniques described in relation to the flowchart of FIG. 12 may be performed by one or more controllers or processors of the wireless device along with its wireless or RF transceiver(s). A computer program product which may embody the technique may include a computer readable medium (e.g. memory of the communication device, computer disk, CD-ROM, etc.) having computer instructions stored therein which are executable by the one or more processors of the wireless device for performing the technique.

Beginning at a start block 1202 of FIG. 12, the wireless device operates to communicate via the first wireless transceiver over a first wireless connection with a first device (step 1204 of FIG. 12). The communications to and from the wireless device over the first wireless connection of the first wireless transceiver are addressed with a first hardware address that is assigned to the first wireless transceiver. This first hardware address may be the address that was read from memory of the first wireless transceiver and stored in device memory as described in relation to steps 1104 and 1106 of FIG. 11.

During communications in relation to step 1204, the wireless device may receive, via the first wireless transceiver over the first wireless connection, data in one or more data frames having a destination address which is the first hardware address. Additionally or alternatively, the wireless device may send, via the first wireless transceiver over the first wireless connection, data in one or more data frames having a source address which is the first hardware address. See e.g. the discussion in relation to FIG. 9. Also additionally or alternatively, the wireless device may operate to advertise its presence and/or availability to surrounding devices (e.g. in a discovery procedure), via the first wireless transceiver, using the first hardware address to identify itself.

In addition, the wireless device operates to communicate via the first wireless transceiver over a second wireless connection with a second device (step 1206 of FIG. 6). The communications to and from the wireless device over the second wireless connection of the first wireless transceiver are addressed with a second hardware address that is assigned to the second wireless transceiver. This second hardware address may be the address that was read from memory of the second wireless transceiver and stored in device memory as described in relation to steps 1108 and 1110 of FIG. 11.

During communications in relation to step 1204, the wireless device may receive, via the first wireless transceiver over the second wireless connection, data in one or more data frames having a destination address which is the second hardware address. Additionally or alternatively, the wireless device may send, via the first wireless transceiver over the second wireless connection, data in one or more data frames having a source address which is the second hardware address. See again e.g. the discussion in relation to FIG. 9. Also, for example, the wireless device may operate to advertise its presence and/or availability to surrounding devices (e.g. in a discovery procedure), via the first transceiver, using the second hardware address to identify itself.

The first and second hardware addresses may be the universally administered hardware addresses that are assigned to the first and the second wireless transceivers, respectively. These universally administered hardware addresses may be the MAC addresses assigned to the wireless transceivers during manufacture. The first wireless transceiver may be configured to communicate in accordance with an IEEE 802.11 communications standard, and the second wireless transceiver may be configured to communicate in accordance with a BLUETOOTH® communications standard. Thus, in some embodiments, the wireless device may utilize the MAC address of the IEEE 802.11 transceiver for identifying the device for communications via the IEEE 802.11 transceiver for WLAN-STA connections, and utilize the MAC address of the BLUETOOTH transceiver for communications via the IEEE 802.11 transceiver for Wi-Fi P2P connections. The wireless device may also utilize the MAC address of the BLUETOOTH transceiver for identifying the device in association with BLUETOOTH connections via the BLUETOOTH transceiver.

The first and the second wireless connections in steps 1204 and 1206 may be concurrently maintained by the wireless device. For example, the wireless device may operate as a concurrent device in accordance with or be compatible with the Wi-Fi P2P wireless network protocols in the Wi-Fi Peer-To-Peer (P2P) Technical specification.

In some embodiments, one or more additional steps may be included in the method of FIG. 12. In one embodiment, wireless device operates to communicate via the second wireless transceiver over a third wireless connection with a third device. The communications to and from the wireless device over the third wireless connection of the second wireless transceiver are addressed with the second hardware address that is assigned to the second wireless transceiver. During these communications, the wireless device may receive, via the second wireless transceiver over the second wireless connection, data in one or more data frames having a destination address which is the second hardware address. Additionally or alternatively, the wireless device may send, via the second wireless transceiver over the second wireless connection, data in one or more data frames having a source address which is the second hardware address. Also alternatively, for example, the wireless device may operate to advertise its presence and/or availability to surrounding devices (e.g. in a discovery procedure), via the second transceiver, using the second hardware address to identify itself.

In such embodiments, the wireless device may further operate to concurrently maintain the first, the second, and the third wireless connections via the first and the second wireless transceivers. Here, the same second hardware address is utilized for identifying the communications to and/or from the wireless device over the second and the third wireless connections. In this case, the device operates to mark the communications for one of the wireless connections for distinguishing therebetween. For example, the device may mark the locally administered bit for the MAC address for use of the third wireless connection.

In further embodiment, the wireless device may operate to switch from communicating via the first wireless transceiver over the second wireless connection with the second device to communicating via the second wireless transceiver over the third wireless connection with the second device. This switching may be performed, for example, in order to reduce power consumption of the wireless device while maintaining communications with the second device. Accordingly, the wireless device may subsequently operate to switch back from communicating via the second wireless transceiver over the third wireless connection to the first wireless transceiver over the second wireless connection. This switching back may be performed for example, in order to increase data throughput of the wireless device.

Thus, as described herein, a wireless communication device of the present disclosure includes a first wireless transceiver and a second wireless transceiver. The wireless device is configured for communicating via the first wireless transceiver over a first wireless connection with a first device, where communications to and from the wireless device are identified using a first (universally administered) hardware address assigned to the first wireless transceiver. The wireless device is further configured for communicating via the first wireless transceiver over a second wireless connection with a second device, where communications to and from the wireless device are identified with a second (universally administered) hardware address assigned to the second wireless transceiver. The first and second hardware addresses may be Media Access Control (MAC) addresses of the first and the second wireless transceivers. The first and the second wireless connections may be concurrent wireless connections. In some embodiments, the first wireless transceiver may be configured for communications in accordance with an IEEE 802.11 standard, and the second wireless transceiver may be configured for communications in accordance with a BLUETOOTH® standard. The first wireless connection may be a wireless local area network (WLAN) infrastructure connection, and the second wireless connection may be a WiFi Peer-to-Peer (P2P) connection. Thus, in some embodiments, the wireless device may utilize the MAC address of the IEEE 802.11 transceiver for identifying communications to and/or from the device via the IEEE 802.11 transceiver for WLAN-STA connections, and utilize the MAC address of the BLUETOOTH transceiver for identifying communications to and/or from the device via the IEEE 802.11 transceiver for Wi-Fi P2P connections.

In other embodiments, a wireless device of the present disclosure is configured for reading from memory of the first wireless transceiver a first hardware address that is assigned to the first wireless transceiver, and storing in device memory the first hardware address for subsequent use in identifying communications to and/or from the wireless device via the first wireless transceiver for a first type of wireless connection. The wireless device is further configured for reading from memory of the second wireless transceiver a second hardware address that is assigned to the second wireless transceiver, and storing in the device memory the second hardware address for subsequent use in identifying communications to and/or from the wireless device via the first wireless transceiver for a second type of wireless connection. The first and second hardware addresses may be Media Access Control (MAC) addresses of the first and the second wireless transceivers. The first and the second types of wireless connections may be types of concurrent wireless connections. In some embodiments, the first wireless transceiver may be configured for communications in accordance with an IEEE 802.11 standard, and the second wireless transceiver may be configured for communications in accordance with a BLUETOOTH® standard. The first type of wireless connection may be a wireless local area network (WLAN) infrastructure type of connection, and the second wireless connection may be a WiFi Peer-to-Peer (P2P) type of connection. Thus, in some embodiments, the wireless device may utilize the MAC address of the IEEE 802.11 transceiver for identifying communications to and/or from the device via the IEEE 802.11 transceiver for WLAN-STA type of connections, and utilize the MAC address of the BLUETOOTH transceiver for identifying communications to and/or from the device via the IEEE 802.11 transceiver for Wi-Fi P2P type of connections.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e. IEEE 802.16), or an Ultra-WideBand (UWB) network (i.e. IEEE 802.15). The invention described herein in the recited claims intends to cover and embrace all suitable changes in technology.

What is claimed is:

1. A method in a wireless communication device which includes a first wireless transceiver and a second wireless transceiver, the method comprising:
communicating via the first wireless transceiver over a first wireless connection with a first device, where communications to and/or from the wireless device are addressed with a first universally administered hardware address assigned to the first wireless transceiver; and
communicating via the first wireless transceiver over a second wireless connection with a second device, where communications to and/or from the wireless device are addressed with a second universally administered hardware address assigned to the second wireless transceiver.

2. The method of claim 1, further comprising:
concurrently maintaining the first and the second wireless connections via the first wireless transceiver.

3. The method of claim 1, further comprising:
communicating via the second wireless transceiver over a third wireless connection with a third device, where communications to and from the wireless device are addressed with the second universally administered hardware address assigned to the second wireless transceiver.

4. The method of claim 1, further comprising:
communicating via the second wireless transceiver over a third wireless connection with the second device, where communications to and from the wireless device are addressed with the second universally administered hardware address assigned to the second wireless transceiver.

5. The method of claim 4, further comprising:
switching from communicating via the first wireless transceiver over the second wireless connection with the second device to communicating via the second wireless transceiver over the third wireless connection with the second device.

6. The method of claim 1, wherein the first universally administered hardware address comprises a first Media Access Control (MAC) address assigned to the first wireless transceiver, and the second universally administered hardware address comprises a second MAC address assigned to the second wireless transceiver.

7. The method of claim 1, wherein the first wireless transceiver is configured to communicate in accordance with an IEEE 802.11 communications standard.

8. The method of claim 1, wherein the second wireless transceiver is configured to communicate in accordance with a BLUETOOTH® communications standard.

9. The method of claim 1, wherein the first wireless connection comprises a wireless local area network (WLAN) infrastructure connection.

10. The method of claim 1, wherein the second wireless connection comprises a WiFi Peer-to-Peer (P2P) connection.

11. A computer program product, comprising:
a non-transitory computer readable medium;
computer instructions stored in the non-transitory computer readable medium;
the computer instructions being executable by one or more processors of a wireless communication device which includes a first wireless transceiver and a second wireless transceiver, for:
communicating via the first wireless transceiver over a first wireless connection with a first device, where communications to and/or from the wireless device are addressed using a first universally administered hardware address assigned to the first wireless transceiver; and
communicating via the first wireless transceiver over a second wireless connection with a second device, where communications to and/or from the wireless device are addressed using a second universally administered hardware address assigned to the second wireless transceiver.

12. The computer program product of claim 11, wherein the first wireless transceiver is configured for communications in accordance with an IEEE 802.11 communications standard, the second wireless transceiver is configured for communications in accordance with a BLUETOOTH® communications standard, the first wireless connection comprises a wireless local area network (WLAN) infrastructure connection, and the second wireless connection comprises a WiFi Peer-to-Peer (P2P) connection.

13. A wireless communication device, comprising:
one or more processors;
first and second wireless transceivers coupled to the one or more processors;
the one or more processors being configured for:
communicating via the first wireless transceiver over a first wireless connection with a first device, where communications to and/or from the wireless device are addressed with a first universally administered hardware address assigned to the first wireless transceiver; and
communicating via the first wireless transceiver over a second wireless connection with a second device, where communications to and/or from the wireless device are addressed with a second universally administered hardware address assigned to the second wireless transceiver.

14. The wireless device of claim 13, wherein the one or more processors are further configured for:
concurrently maintaining the first and the second wireless connections via the first wireless transceiver.

15. The wireless device of claim 13, wherein the one or more processors are further configured for:
communicating via the second wireless transceiver over a third wireless connection with a third device, where communications to and from the wireless device are addressed with the second universally administered hardware address assigned to the second wireless transceiver.

16. The wireless device of claim 13, wherein the one or more processors are further configured for:
communicating via the second wireless transceiver over a third wireless connection with the second device, where communications to and from the wireless device are addressed with the second universally administered hardware address assigned to the second wireless transceiver.

17. The wireless device of claim 16, wherein the one or more processors are further configured for:
switching from communicating via the first wireless transceiver over the second wireless connection with the second device to communicating via the second wireless transceiver over the third wireless connection with the second device.

18. The wireless device of claim 13, wherein the first universally administered hardware address comprises a first Media Access Control (MAC) address that is assigned to the first wireless transceiver, and the second universally administered hardware address comprises a second MAC address that is assigned to the second wireless transceiver.

19. The wireless device of claim 13, wherein the first wireless transceiver is configured to communicate in accordance with an IEEE 802.11 communications standard, the second wireless transceiver is configured to communicate in accordance with a BLUETOOTH® communications standard, the first wireless connection comprises a wireless local area network (WLAN) infrastructure connection, and the second wireless connection comprises a WiFi Peer-to-Peer (P2P) connection.

20. A method in a wireless communication device which includes a first wireless transceiver and a second wireless transceiver, the method comprising:
reading, from memory of the first wireless transceiver, a first universally administered hardware address assigned to the first wireless transceiver;
storing, in device memory of the wireless device, the first hardware address for use in identifying communications to and/or from the wireless device via the first wireless transceiver for a first type of wireless connection;
reading, from memory of the second wireless transceiver, a second universally administered hardware address assigned to the second wireless transceiver; and
storing, in the device memory, the second universally administered hardware address for use in identifying communications to and/or from the wireless device via the first wireless transceiver for a second type of wireless connection.

* * * * *